(12) United States Patent
Huang et al.

(10) Patent No.: US 7,794,111 B2
(45) Date of Patent: Sep. 14, 2010

(54) WHITE LIGHT ILLUMINATOR AND READING LAMP USING THE SAME

(75) Inventors: Chung-Yuan Huang, Santa Clara, CA (US); Jer-Haur Kuo, Taipei Hsien (TW); Xin-Xiang Zha, Shenzhen (CN); Lin Yang, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 324 days.

(21) Appl. No.: 12/038,820

(22) Filed: Feb. 28, 2008

(65) Prior Publication Data
US 2009/0161355 A1    Jun. 25, 2009

(30) Foreign Application Priority Data
Dec. 19, 2007   (CN) .................. 2007 1 0125259

(51) Int. Cl.
*F21V 5/00*   (2006.01)
(52) U.S. Cl. .................. 362/246; 362/231; 362/612
(58) Field of Classification Search ................ 362/231, 362/246, 235, 410
See application file for complete search history.

(56) References Cited
U.S. PATENT DOCUMENTS
5,255,171 A * 10/1993 Clark .................. 362/231

| | | | |
|---|---|---|---|
| 6,200,002 B1 * | 3/2001 | Marshall et al. | 362/231 |
| 7,090,388 B2 | 8/2006 | Yagi et al. | |
| 7,441,930 B2 * | 10/2008 | Lin | 362/410 |
| 7,450,809 B2 | 11/2008 | Choi et al. | |
| 7,549,776 B2 | 6/2009 | Maeda et al. | |
| 2006/0285356 A1 | 12/2006 | Tseng | |

FOREIGN PATENT DOCUMENTS

| | | |
|---|---|---|
| CN | 1550800 A | 12/2004 |
| CN | 1749823 A | 3/2006 |
| CN | 1904691 A | 1/2007 |
| CN | 1982120 A | 6/2007 |

\* cited by examiner

*Primary Examiner*—Ali Alavi
(74) *Attorney, Agent, or Firm*—Frank R. Niranjan

(57) ABSTRACT

A reading lamp (100) includes a lamp holder (20), a lampshade (40), a bracket (30) connecting the lamp holder with the lampshade, and a white light illuminator (50) received in the lampshade. The white light illuminator includes a light mixer (52), and at least a group of solid-state, light emitting elements (544) arranged to at least one side of the light mixer. The at least a group of solid-state, light emitting elements includes three kinds of solid-state, light emitting elements which respectively emit red, green and blue lights. The light mixer reflects, refracts and mixes the red, green and blue lights to obtain white light which directly radiates and spreads from a light emitting surface (521) of the light mixer.

15 Claims, 5 Drawing Sheets

WHITE LIGHT ILLUMINATOR AND READING LAMP USING THE SAME

BACKGROUND

1. Technical Field

The present invention relates generally to white light illuminators and reading lamps using the same.

2. Description of Related Art

An LED (light emitting diode) is a type of solid-state, light emitting component, which is widely used in daily life, such as in illumination devices or non-emissive display devices, due to the high brightness, long life-span, and wide color gamut of the LED.

White LEDs usually include blue LED chips which are capsulated in transparent capsulations doped with yellow phosphors therein. In operation of the white LEDs, blue lights emitted by the blue LED chips activate the yellow phosphors to emit yellow lights. The yellow lights mix with the blue lights to thereby obtain white lights.

In ordinary illuminators, the LEDs usually cooperate with light guide plates so as to convert point light sources generated by the LEDs into to surface light sources. When the white lights generated by the white LEDs pass through the light guide plates, the white lights are dispersed into many kinds of colored lights due to prism effect generated by the light guide plates, which decreases color renditions of white light illuminators. Therefore, there is a need to provide white illuminators having good color renditions.

SUMMARY

The present invention, in one aspect, provides a white light illuminator having a good color rendition. The white light illuminator includes a light mixer, and at least a group of solid-state, light emitting elements arranged to at least one side of the light mixer. The at least a group of solid-state, light emitting elements includes three kinds of solid-state, light emitting elements which respectively emit red, green and blue lights. The red, green and blue lights are reflected, refracted and mixed together in the light mixer to obtain white light which directly spreads out of the light mixer via a light emitting surface thereof.

The present invention, in another aspect, provides a reading lamp having a white light illuminator. The reading lamp includes a lamp holder, a lampshade, a bracket connecting the lamp holder with the lampshade, and a white light illuminator received in the lampshade. The white light illuminator includes a light mixer, and at least a group of solid-state, light emitting elements arranged to at least one side of the light mixer. The at least a group of solid-state, light emitting elements includes three kinds of solid-state, light emitting elements which respectively emit red, green and blue lights. The red, green and blue lights are reflected, refracted and mixed in the light mixer to obtain white light which directly radiates and spreads out of the light mixer via a light emitting surface thereof.

Other advantages and novel features of the present white light illuminator and reading lamp will become more apparent from the following detailed description of preferred embodiments when taken in conjunction with the accompanying drawings, in which:

DETAILED DESCRIPTION

Figure 1:
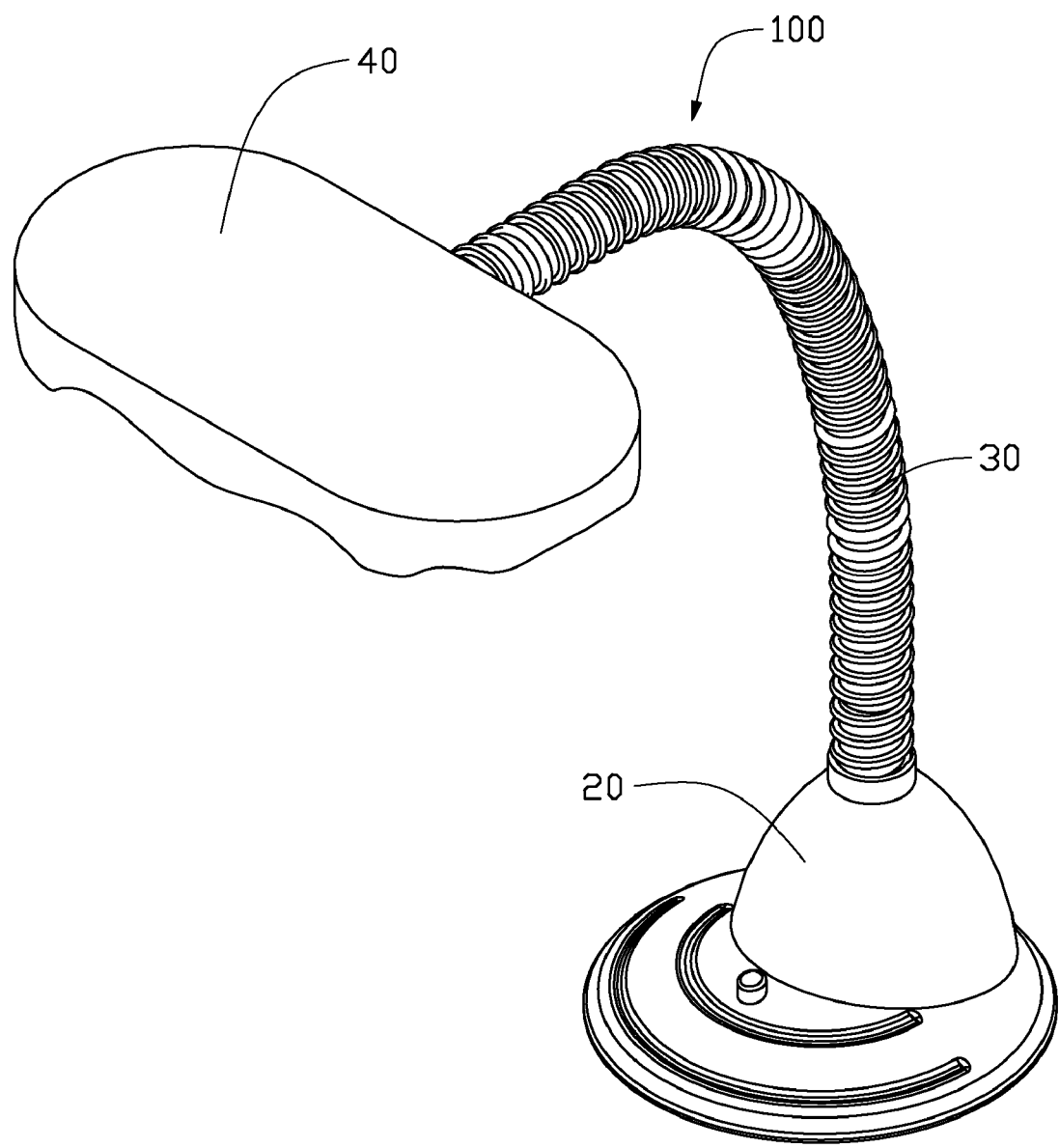
FIG. 1 is an isometric view of a reading lamp according to a preferred embodiment of the present invention.

Reference will now be made to the drawing figures to describe the preferred embodiment in detail.

Figure 2:
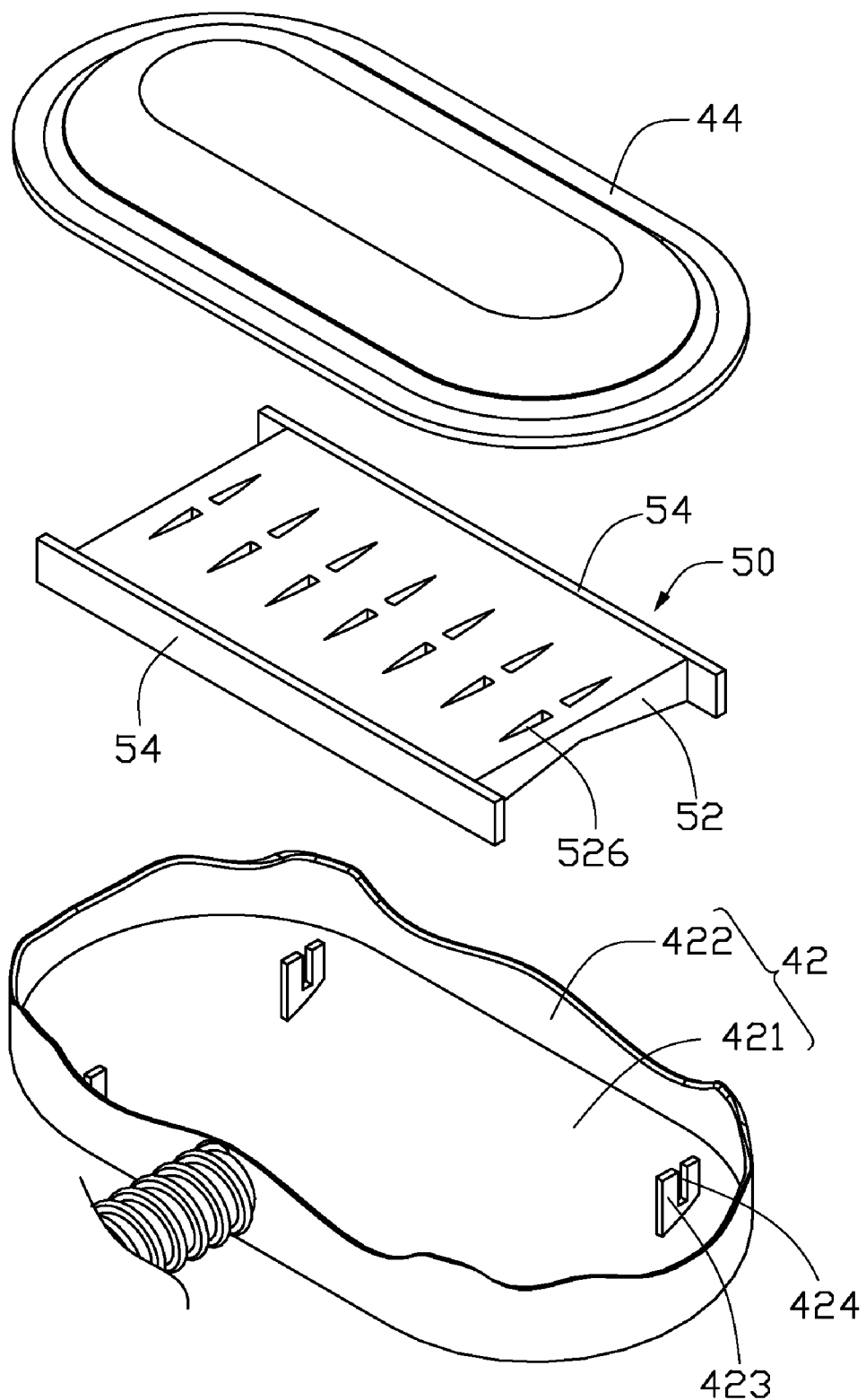
FIG. 2 is an exploded view of a portion of the reading lamp of FIG. 1.

Referring to FIGS. 1 and 2, a reading lamp 100 according to a preferred embodiment of the present invention is shown. The reading lamp 100 includes a lamp holder 20, a bracket 30, a lampshade 40 and a white light illuminator 50.

The lamp holder 20 is disposed at a bottom portion of the reading lamp 100 for mounting the reading lamp 100 on a desktop. The bracket 30 is disposed between the lamp holder 20 and the lampshade 40, supporting the lampshade 40 on the lamp holder 20. The bracket 30 can be used to regulate the lampshade 40 to a desirable height and angle which can help the user to study or work comfortably.

Figure 3:
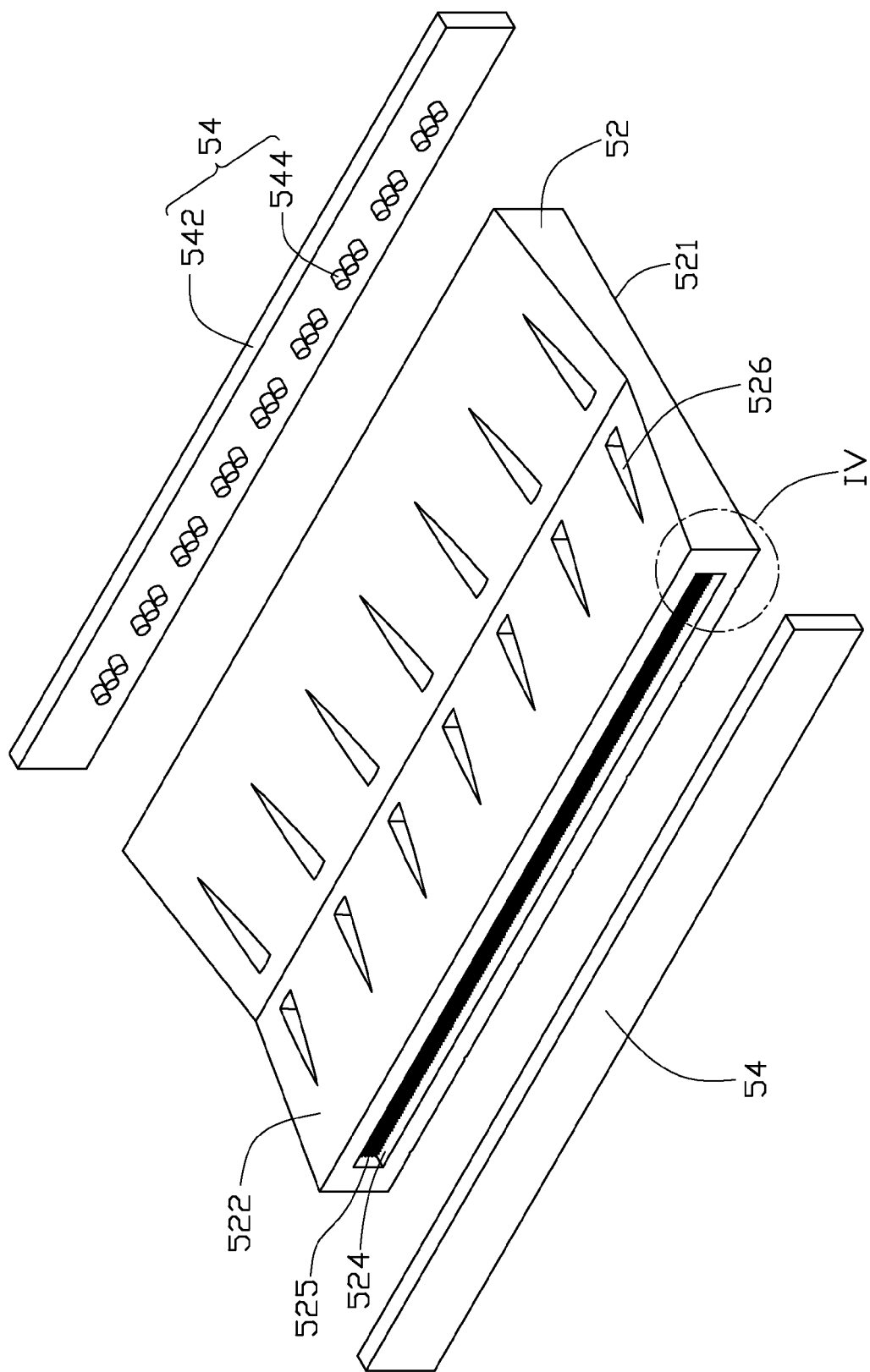
FIG. 3 is an exploded, isometric view of a white light illuminator of the reading lamp of FIG. 1.

Referring to FIG. 3, the white light illuminator 50 includes a light mixer 52 and two linear-shaped light emitting diode arrays 54.

The light mixer 52 is made of a transparent material such as polymethylmethacrylate (PMMA), or glass. The light mixer 52 includes a planar light emitting surface 521, and a reflecting surface 522 which is opposite to the light emitting surface 521.

The reflecting surface 522 of the light mixer 52 is V-shaped in profile. A thickness of the light mixer 52 gradually decreases from right and left sides of the light mixer 52 towards a middle portion thereof. Lights entering into the light mixer 52 from the light emitting diode arrays 54 are refracted and reflected by the reflecting surface 522 and shoot towards the light emitting surface 521 along different directions. The lights are therefore mixed in the light mixer 52 and uniformly distributed over the light emitting surface 521. The V-shaped configuration of the reflecting surface 522 decreases incidence angles of the lights shot from the light emitting diode arrays 54 onto the reflecting surface 522 as compared with a planar reflecting surface. Thus, there are more lights being totally reflected by the reflecting surface 522 towards the light emitting surface 521, which increases luminance of the light spreading from the light emitting surface 521 of the light mixer 52. Alternatively, a reflecting layer (not shown) can be coated on or a plurality of V-shaped tiny grooves (not shown) can be carved in the reflecting surface 522 so as to increase the luminance of the light spreading from the light emitting surface 521 of the light mixer 52.

The light mixer 52 defines two elongated grooves 524 recessed in the right and left sides thereof, respectively. Each of the grooves 524 has a rectangular-shaped transverse section. The light emitting diode arrays 54 are respectively received in the grooves 524 of the light mixer 52, thereby decreasing loss of lights leaked from the light emitting diode arrays 54 without entering the light mixer 52, and thereby increasing luminance of the light spreading from the light emitting surface 521 of the light mixer 52.

Figure 4:
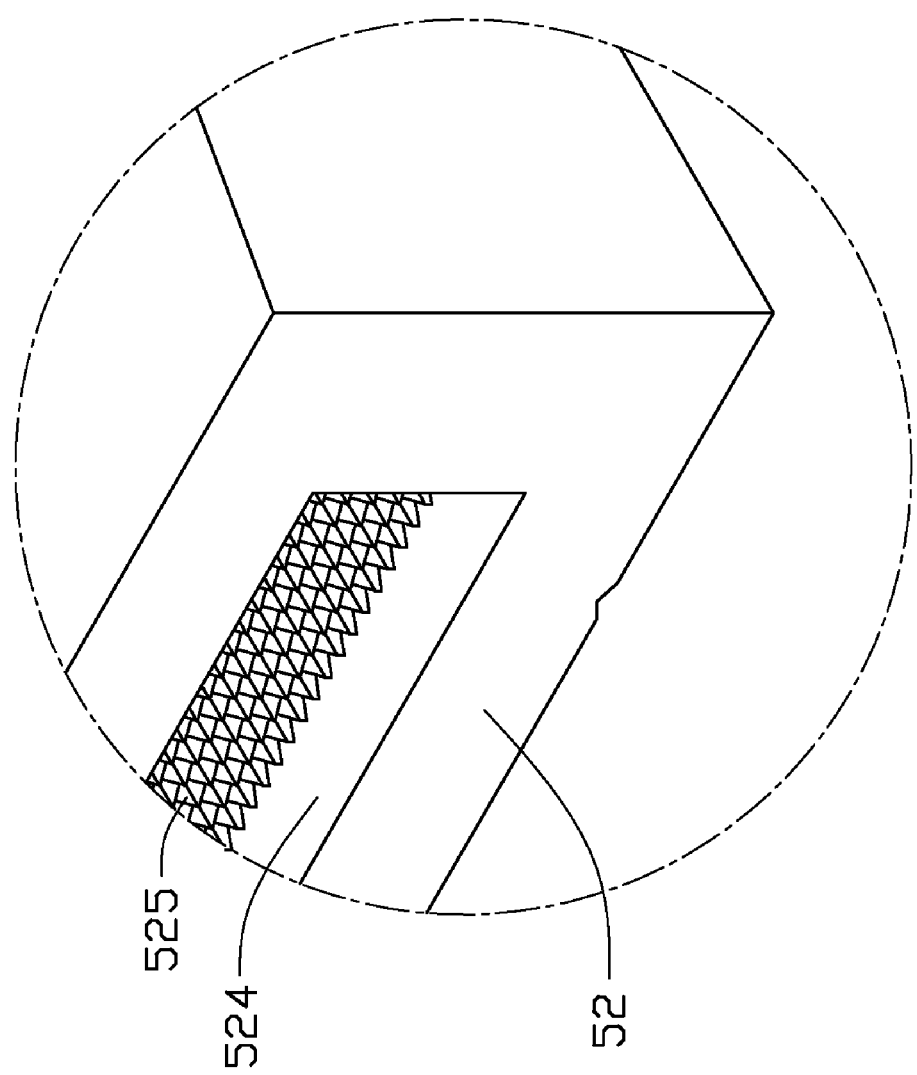
FIG. 4 is an enlarged view of a part of the white light illuminator of FIG. 3, indicated by circle IV thereof.

Particularly referring to FIG. 4, a plurality of protruding points 525 are formed on an inner face (not labeled) of the light mixer 52 defining an inner side of each of the grooves 524. The protruding point 525 has a pyramid-shaped configuration and the protruding points 525 are closely packed in the groove 524 so as to induce more light to enter into the light mixer 52. Alternatively, the protruding point 525 may have other configurations such as conical-shaped or hemispheric-shaped configuration, which may induce more light to enter into the light mixer 52.

Figure 5:
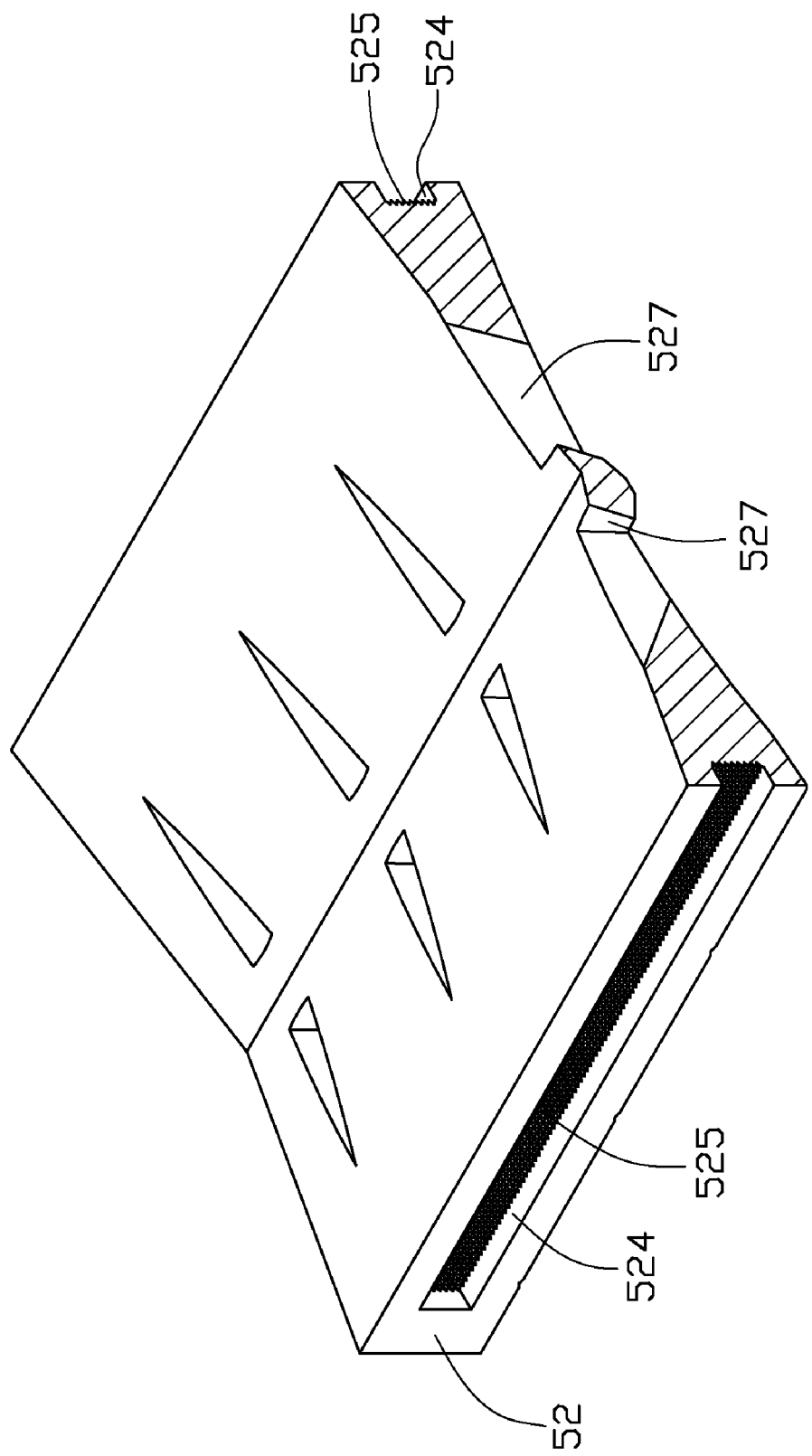
FIG. 5 is an isometric view of a light mixer of the white light illuminator of FIG. 3, with a part thereof being transversely cut away.

Referring to FIG. 5, the light mixer 52 defines two groups of openings 526 which are symmetrically defined in the light mixer 52 with respect to a longitudinal central line of the light mixer 52. The openings 526 extend through the light mixer 52 and each group is arranged along a longitudinal direction of the light mixer 52. Each of the openings 526 has a triangular shape and thereby is defined by three sidewalls 527 of the light mixer 52. The three sidewalls 527 surround a corresponding opening 526. A size of the transverse section of each of the openings 526 gradually decreases from the reflecting surface 522 towards the light emitting surface 521. The sidewalls 527 surrounding each opening 526 each have two sides converging toward the light emitting surface 521 of the light mixer 52. The sidewalls 527 surrounding the openings 526 reflect more lights towards the light emitting surface 521 of the light mixer 52 and therefore increase luminance of the light spreading from the light emitting surface 521.

Referring to FIG. 3, the light emitting diode array 54 includes an elongate base 542 and a plurality of groups of light emitting diodes 544 (LEDs) mounted to the base 542.

The light emitting diode arrays 54 are mounted to the light mixer 52 by gluing the bases 542 of the light emitting diode arrays 54 to sidewalls of the light mixer 52 surrounding the grooves 524 of the light mixer 52. The light emitting diodes 544 are received in the grooves 524. A plurality of circuits (not shown) are arranged on the base 542 of the light emitting diode arrays 54. The light emitting diodes 544 of the light emitting diode arrays 54 electrically connected with the circuits and further electrically connected with a power supply (not shown). The base 542 of the light emitting diode array 54 is made of materials having good thermal conductivity such as metals or ceramics so as to dissipate heat generated by the light emitting diodes 544. The base 542 of the light emitting diode array 54 is preferably made of metals such as aluminum or copper. A layer of electric insulating material (not shown) is coated on outer surfaces of wires of the circuits, thereby electrically insulating the circuits from the bases 542 of the light emitting diode arrays 54, and preventing the circuits from short circuit.

The groups of the light emitting diodes 544 each are arranged along a longitudinal direction of each of the bases 542 of the light emitting diode arrays 54. Each group of the light emitting diodes 544 includes three kinds of light emitting diodes, i.e., red, green and blue light emitting diodes 544. In operation of the white light illuminator 50, red, green and blue lights emitted from the red, green and blue light emitting diodes 544 enter into the light mixer 52 through the protruding points 525. The red, green and blue lights entered into the light mixer 52 are reflected by the reflecting surface 522 and/or the sidewalls 527 surrounding the openings 526, and mix together to obtain white light which shoots and spreads out of the light mixer 52 from the light emitting surface 521 to illuminate an article required to be lightened, such as a book.

Referring to FIG. 2, the lampshade 40 includes a top cover 42 which connects with the bracket 30 of the reading lamp 100, and a bottom casing 44 which covers a bottom opening of the top cover 42. The top cover 42 includes a top wall 421, a sidewall 422 extending downwardly from a periphery of the top wall 421, and four legs 423 extending downwardly from four corners of the top wall 421. Each of the legs 423 defines a slot 424 which extends through a bottom end of the leg 423. Front and rear ends of the base 542 of the light emitting diode arrays 54 are interferentially engaged in the slots 424 of the legs 423, thereby mounting the white light illuminator 50 to the lampshade 40.

The bottom casing 44 of the lampshade 40 is made of transparent materials such as glass or epoxy resin. The bottom casing 44 is mounted to the top cover 42 via interferential engagement between a periphery of the bottom casing 44 and an inner surface of the sidewall 422 of the top cover 42. The bottom casing 44 is used for protecting the white light illuminator 50 from being damaged and preventing external dusts from entering into an inner side of the lampshade 40. A middle portion of the bottom casing 44 projects downwardly so that the middle portion of the bottom casing 44 is spaced a distance from the light emitting surface 521 of the white light illuminator 50.

In the present reading lamp 100, the white light is obtained from a mixture of three kinds of monochromatic lights, i.e., the red, green and blue lights emitted by the red, green and blue light emitting diodes 544, respectively. The monochromatic red, green and blue lights are reflected, refracted and mixed in the light mixer 52 to become the white light, which directly spreads out of the light mixer 52 from the light emitting surface 521 to radiate at the object to be lightened. The white light does not need to be transmitted via a light guide plate; thus, the white light generated by the present invention will not be dispersed into colored lights due to the prism effect of the light guide plate. Therefore, the present white light illuminator 50 has better color rendition than the conventional white light illuminator. Furthermore, the sidewalls 527 surrounding the openings 526 increase the reflecting area of the light mixer 52 for lights, which include the red, green and blue lights to be more evenly mixed together, thereby increasing the color rendition of the obtained white light.

Moreover, due to the light emitting diodes 544 being single elements which are separate from each other, one of the light emitting diodes 544 of the present white light illuminator 50 can be repaired or replaced without affecting other light emitting diodes 544 of the present white light illuminator 50. Compared with a conventional white light illuminator which obtains the white light via enveloped red, green and blue light emitting diode chips in a transparent capsulation, the group of the light emitting diodes 544 of the present white light illuminator 50 needs not to be discarded all together when one of the light emitting diodes 544 of the light emitting diode group is broken. This lowers cost of the present white light illuminator 50.

In the present white light illuminator 50, the red, green and blue lights are generated by the red, green and blue light emitting diodes 544. Alternatively, the red, green and blue light emitting diodes 544 can be replaced by other solid-state, light generating elements such as red, green and blue organic light emitting diodes (OLEDs).

In the present white light illuminator 50, the openings 526 are triangular-shaped and the openings 526 extend through the light mixer 52. Alternatively, the openings 526 can be blind holes and have other shapes, such as round, rectangular or pentagon-shaped.

In this embodiment, the white light illuminator 50 is used as a light source of the reading lamp 100. Alternatively, the white light illuminator 50 can be used in other applications, such as backlight modules of liquid crystal displays, light sources of toys, light sources of flashlights, or light sources of indicators.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A white light illuminator comprising:
   a light mixer having a light emitting surface; and
   at least a group of solid-state, light emitting elements arranged to at least one side of the light mixer, the at least a group of solid-state, light emitting elements comprising three kinds of solid-state, light emitting elements which respectively emit red, green and blue lights, the red, green and blue lights being mixed in the light mixer to obtain white light which directly emits and spreads from the light emitting surface of the light mixer;
   wherein the light mixer defines at least a groove which receives the at least a group of solid-state, light emitting elements therein, and a plurality of protruding points are formed on and closely packed on an inner surface of the light mixer defining the at least a groove.

2. The white light illuminator of claim 1, wherein each of the solid-state, light emitting elements is a light emitting diode.

3. The white light illuminator of claim 1, wherein the light mixer comprises a V-shaped reflecting surface.

4. The white light illuminator of claim 1, wherein the light mixer defines at least an opening therein, and a transverse section of the at least an opening gradually decreases in size from a reflecting surface towards the light emitting surface of the light mixer.

5. The white light illuminator of claim 4, wherein the at least an opening comprises two groups of openings which are symmetrically arranged with respect to a longitudinal central line of the light mixer.

6. The white light illuminator of claim 1, wherein a configuration of each of the protruding points is selected from a group consisting of pyramid shape, conical shape, and hemispheric shape.

7. The white light illuminator of claim 1, wherein the light mixer defines two groups of openings which are symmetrically arranged with respect to a longitudinal central line of the light mixer.

8. The white light illuminator of claim 7, wherein the openings extend through the light mixer.

9. The white light illuminator of claim 7, wherein the openings each have one of following shapes: round shape, triangular shape, rectangular shape and pentagon shape.

10. The white light illuminator of claim 1, wherein the at least a group of solid-state, light emitting elements are mounted to a metal base.

11. A reading lamp comprising:
    a lamp holder;
    a lampshade;
    a bracket connecting the lamp holder with the lampshade; and
    a white light illuminator received in the lampshade, the white light illuminator comprising:
    a light mixer; and
    at least a group of solid-state, light emitting elements arranged to at least one side of the light mixer, the at least a group of solid-state, light emitting elements comprising three kinds of solid-state, light emitting elements which respectively emit red, green and blue lights, the red, green and blue lights being mixed in the light mixer to generate white light which directly radiates and spreads out of the light mixer via a light emitting surface thereof;
    wherein the lampshade comprises four legs each of which defines a slot therein, the white light illuminator comprising a metal base on which the at least a group of solid-state, light emitting elements is mounted, the white light illuminator being mounted to the lampshade via engagement between the slots of the legs of the lampshade and the metal base of the white light illuminator.

12. The reading lamp of claim 11, wherein the light mixer defines at least an opening therein, and a transverse section of the at least an opening gradually decreases in size from a reflecting surface towards the light emitting surface of the light mixer, the reflecting surface being opposite to the light emitting surface.

13. The reading lamp of claim 12, wherein the at least an opening comprises two groups of openings which are symmetrically arranged with respect to a longitudinal central line of the light mixer.

14. The reading lamp of claim 13, wherein the light mixer defines at least a groove which receives the at least a group of solid-state, light emitting elements therein, and a plurality of protruding points are formed on an inner surface of the light mixer defining the at least a groove.

15. A white light illuminator comprising:
    a light mixer having a light emitting surface; and
    at least a group of solid-state, light emitting elements arranged to at least one side of the light mixer, the at least a group of solid-state, light emitting elements comprising three kinds of solid-state, light emitting elements which respectively emit red, green and blue lights, the red, green and blue lights being mixed in the light mixer to obtain white light which directly emits and spreads from the light emitting surface of the light mixer;
    wherein the light mixer defines at least an opening therein, and a transverse section of the opening gradually decreases in size from a reflecting surface towards the light emitting surface of the light mixer.

* * * * *